United States Patent
Hakamata

(10) Patent No.: US 7,176,477 B2
(45) Date of Patent: Feb. 13, 2007

(54) READ-OUT SCANNING EXPOSURE METHOD AND APPARATUS

(75) Inventor: Kazuo Hakamata, Kanagawa-ken (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 0 days.

(21) Appl. No.: 10/973,345

(22) Filed: Oct. 27, 2004

(65) Prior Publication Data

US 2005/0087708 A1    Apr. 28, 2005

(30) Foreign Application Priority Data

Oct. 28, 2003    (JP)    ............................. 2003-366892

(51) Int. Cl.
G01N 23/04    (2006.01)

(52) U.S. Cl. .................. 250/591; 348/370; 250/580; 378/29; 378/98.8

(58) Field of Classification Search ................ 250/591; 348/370
See application file for complete search history.

(56) References Cited

U.S. PATENT DOCUMENTS

| | | | |
|---|---|---|---|
| 4,604,634 A * | 8/1986 | Feigt et al. ................. | 347/129 |
| 4,948,974 A * | 8/1990 | Nelson et al. ............ | 250/358.1 |
| 5,050,199 A * | 9/1991 | Watanabe .................... | 378/146 |
| 6,268,614 B1 | 7/2001 | Imai | |
| 6,310,358 B1 * | 10/2001 | Zur ............................ | 250/591 |
| 6,376,857 B1 | 4/2002 | Imai | |
| 2003/0057386 A1 | 3/2003 | Imai et al. | |
| 2003/0136914 A1 * | 7/2003 | Shoji ....................... | 250/370.1 |

* cited by examiner

*Primary Examiner*—Renee Loebke
*Assistant Examiner*—Mary Zettl
(74) *Attorney, Agent, or Firm*—Sughrue Mion, PLLC

(57) ABSTRACT

A light irradiating device provided with line light sources is located in association with an image recording medium. The line light sources are located in parallel and at approximately identical pitches with respect to a scanning direction. A slit array plate having slits is located between the image recording medium and the light irradiating device. Each of the slits is located at a position corresponding to the position of one of the line light sources. The light irradiating device is controlled such that line light beams are radiated out one after another with different timing from the line light sources.

37 Claims, 10 Drawing Sheets

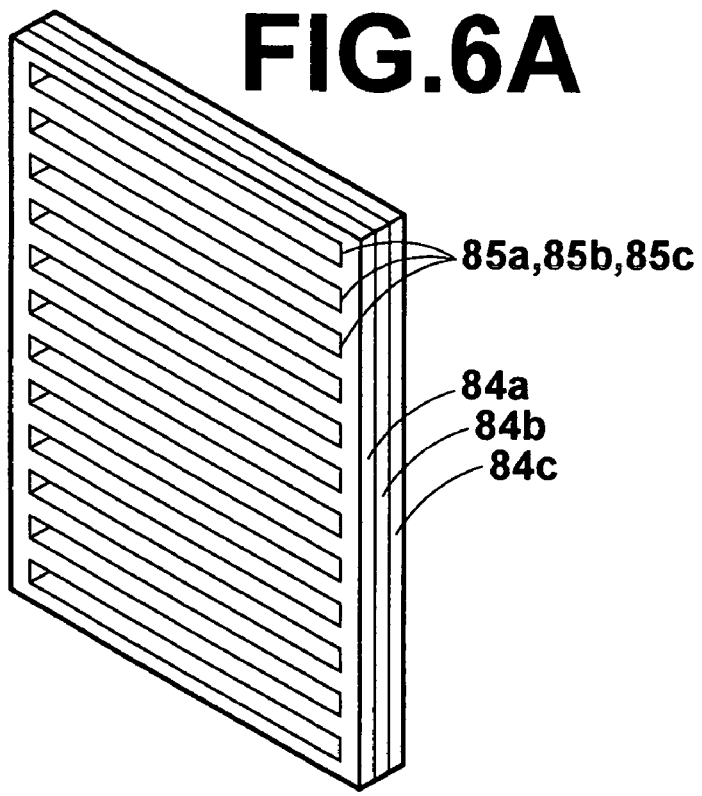
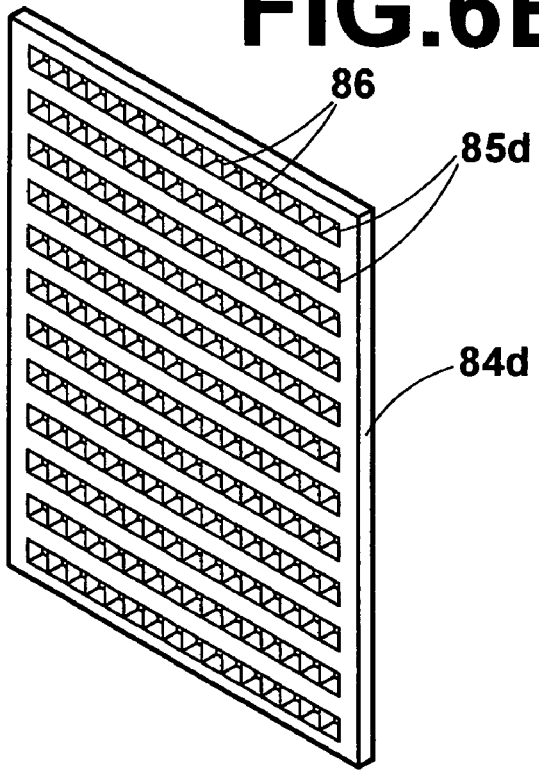

READ-OUT SCANNING EXPOSURE METHOD AND APPARATUS

BACKGROUND OF THE INVENTION

1. Field of the Invention

This invention relates to a read-out scanning exposure method and apparatus, in which an image recording medium carrying image information recorded thereon is scanned with line light beams having been radiated out from line light sources, the scanning being performed in a scanning direction intersecting with a longitudinal direction of each of the line light sources, in order for the recorded image information to be read out from the image recording medium.

2. Description of the Related Art

Image information recording and read-out systems, in which electrostatic recording materials are utilized, have heretofore been proposed. With the proposed image information recording and read-out systems, such that a radiation dose delivered to an object during a medical X-ray image recording operation may be kept small, and such that the image quality of an image and its capability of serving as an effective tool in, particularly, the efficient and accurate diagnosis of an illness may be enhanced, a photo-conductive material sensitive to X-rays, such as a selenium plate constituted of, e.g., amorphous selenium (a-Se), is employed as an electrostatic recording material. The electrostatic recording material is exposed to radiation, such as X-rays, carrying radiation image information, and latent image charges carrying the radiation image information are thereby accumulated in the electrostatic recording material. Thereafter, the electrostatic recording material is scanned with a line light beam, which has been radiated out from a line light source, and currents occurring in the electrostatic recording material are detected via a striped electrode. In this manner, the electrostatic latent image represented by the latent image charges, i.e. the radiation image information, is read out. (The image information recording and read-out systems, in which the electrostatic recording materials are utilized, are described in, for example, U.S. Pat. No. 6,268,614.)

Also, image information recording and read-out systems, in which stimulable phosphor sheets are utilized as recording media, have heretofore been proposed. With the proposed image information recording and read-out systems, a stimulable phosphor sheet, on which radiation image information has been stored, is scanned with a line light beam, which has been radiated out from a line light source and which causes the stimulable phosphor sheet to emit light in proportion to the amount of energy stored on the stimulable phosphor sheet during exposure of the stimulable phosphor sheet to radiation. Also, the light, which is emitted by the stimulable phosphor sheet when the stimulable phosphor sheet is exposed to the line light beam, is detected. In this manner, the image information, which has been stored on the stimulable phosphor sheet, is read out. As a detecting section for detecting the light emitted by the stimulable phosphor sheet, a photodiode image sensor, a charge coupled device (CCD) image sensor, or a panel-shaped or line-shaped detector, which is provided with a photo-conductive layer capable of exhibiting electrical conductivity when being exposed to the light emitted by the stimulable phosphor sheet. (The image information recording and read-out systems, in which the stimulable phosphor sheets are utilized as the recording media, are described in, for example, U.S. Laid-Open No. 20030057386.)

In the image information recording and read-out systems described above, a read-out scanning exposure apparatus, in which the scanning exposure with the line light beam is performed by mechanically moving the line light source, is utilized. However, in cases where the readout of the image information is performed by use of the read-out scanning exposure apparatus described above, it is not always possible to move the line light source quickly, and it often occurs that the read-out speed is not capable of being kept high. Therefore, there has been proposed a read-out scanning exposure apparatus, wherein a panel-shaped light irradiating section constituted of a plurality of line light sources, which are located at approximately identical pitches and in parallel with one another, is controlled such that line light beams are successively radiated out with different timing from the line light sources, and the scanning exposure with the line light beams is thereby performed. (The proposed read-out scanning exposure apparatus provided with the panel-shaped light irradiating section is described in, for example, U.S. Pat. No. 6,376,857.)

Ordinarily, the panel-shaped light irradiating section and the image recording medium should preferably be electrically isolated from each other. In the read-out scanning exposure apparatus described in U.S. Pat. No. 6,376,857, an electrical insulating layer is located between the panel-shaped light irradiating section and the image recording medium. The line light beam, which has been radiated out from the panel-shaped light irradiating section, passes through the electrical insulating layer and thereafter impinges upon the image recording medium. Therefore, in cases where a light source having a wide light distribution angle, e.g. an electroluminescent light source (an EL light source) is utilized as each of the line light sources, the line width of the line light beam impinging upon the image recording medium becomes wide.

In cases where, for example, a light converging optical system, such as a SELFOC lens array, is located between the panel-shaped light irradiating section and the image recording medium, the line light beam is capable of being converged onto the image recording medium, and the scanning exposure is capable of being performed with the line light beam having a narrow line width. However, ordinarily, the light converging optical system described above has a thickness of as large as approximately 10 mm. Therefore, in such cases, the problems occur in that the thickness of the read-out scanning exposure apparatus, which thickness is taken in the direction of the irradiation of the line light beam, becomes large, and the size of the read-out scanning exposure apparatus is not capable of being kept small.

SUMMARY OF THE INVENTION

The primary object of the present invention is to provide a read-out scanning exposure method, wherein a line width of each of line light beams irradiated to an image recording medium is capable of being kept narrow, while a thickness of a read-out scanning exposure apparatus for performing scanning exposure of the image recording medium with the line light beams successively radiated out from light irradiating means constituted of a plurality of line light sources, which thickness is taken in a direction of irradiation of the line light beam, is being prevented from becoming large.

Another object of the present invention is to provide an apparatus for carrying out the read-out scanning exposure method.

The present invention provides a read-out scanning exposure method, in which an image recording medium carrying image information recorded thereon is scanned with line light beams having been radiated out from line light sources, the scanning being performed in a scanning direction intersecting with a longitudinal direction of each of the line light sources, in order for the recorded image information to be read out from the image recording medium, the method comprising the steps of:

i) locating light irradiating means in association with the image recording medium, the light irradiating means being provided with a plurality of the line light sources, each of which radiates out a line light beam toward the image recording medium, the plurality of the line light sources being located at approximately identical pitches with respect to the scanning direction and in parallel with the longitudinal direction of each of the line light sources, ii) locating a slit array plate between the image recording medium and the light irradiating means, the slit array plate having a plurality of slits, each of which is located at a position corresponding to the position of one of the line light sources, and iii) controlling the light irradiating means such that the line light beams are radiated out one after another with different timing from the line light sources.

In the read-out scanning exposure method in accordance with the present invention, the light irradiating means is provided with the plurality of the line light sources distributed over the entire area of the surface of the light irradiating means, which surface stands facing the image recording medium. The light irradiating means is constituted, such that the line light beams are radiated out one after another from the line light sources, and the scanning exposure is capable of being performed with respect to the entire area of the surface of the image recording medium. Each of the line light sources may be constituted of a plurality of light emitting devices, which are arrayed along a straight line. Alternatively, each of the line light sources may be constituted of one line-like light source. As another alternative, each of the line light sources may be constituted of a plurality of line-like light sources.

The read-out scanning exposure method in accordance with the present invention may be modified such that a transparent protective plate, which is transparent with respect to the line light beams and protects the line light sources, is located between the slit array plate and the light irradiating means. A line light beam, which passes through a certain slit among the slits of the slit array plate without being reflected within the certain slit, should preferably be only the line light beam which has been radiated out from the line light source that corresponds to the aforesaid certain slit.

Also, the read-out scanning exposure method in accordance with the present invention may be modified such that a transparent support plate, which is transparent with respect to the line light beams and supports the image recording medium, is located between the image recording medium and the slit array plate. It is preferable that the line light beams, which have passed through adjacent slits, do not overlap each other on the image recording medium.

Further, the read-out scanning exposure method in accordance with the present invention may be modified such that, in cases where the image information is to be recorded on the image recording medium, at least either one of the slit array plate and the light irradiating means is moved in the scanning direction, such that each of regions of the slit array plate, which regions are other than the slits, is located at a position that intervenes between the image recording medium and one of the line light sources. The slit array plate should preferably be made from a material which does not transmit recording light utilized for the recording of the image information on the image recording medium.

Furthermore, the read-out scanning exposure method in accordance with the present invention may be modified such that the line light sources are electroluminescent light sources.

The present invention also provides a read-out scanning exposure apparatus, in which an image recording medium carrying image information recorded thereon is scanned with line light beams having been radiated out from line light sources, the scanning being performed in a scanning direction intersecting with a longitudinal direction of each of the line light sources, in order for the recorded image information to be read out from the image recording medium, the apparatus comprising:

i) light irradiating means provided with a plurality of the line light sources, each of which radiates out a line light beam toward the image recording medium, the plurality of the line light sources being located at approximately identical pitches with respect to the scanning direction and in parallel with the longitudinal direction of each of the line light sources, ii) a slit array plate, which is located between the image recording medium and the light irradiating means, the slit array plate having a plurality of slits, each of which is located at a position corresponding to the position of one of the line light sources, and iii) scanning exposure control means for controlling the light irradiating means such that the line light beams are radiated out one after another with different timing from the line light sources.

In the read-out scanning exposure apparatus in accordance with the present invention, the light irradiating means is provided with the plurality of the line light sources distributed over the entire area of the surface of the light irradiating means, which surface stands facing the image recording medium. The light irradiating means is constituted, such that the line light beams are radiated out one after another from the line light sources, and the scanning exposure is capable of being performed with respect to the entire area of the surface of the image recording medium. Each of the line light sources may be constituted of a plurality of light emitting devices, which are arrayed along a straight line. Alternatively, each of the line light sources may be constituted of one line-like light source. As another alternative, each of the line light sources may be constituted of a plurality of line-like light sources.

The read-out scanning exposure apparatus in accordance with the present invention may be modified such that the apparatus further comprises a transparent protective plate, which is transparent with respect to the line light beams and protects the line light sources, the transparent protective plate being located between the slit array plate and the light irradiating means. A line light beam, which passes through a certain slit among the slits of the slit array plate, should preferably be only the line light beam which has been radiated out from the line light source that corresponds to the aforesaid certain slit.

Also, the read-out scanning exposure apparatus in accordance with the present invention may be modified such that the apparatus further comprises a transparent support plate, which is transparent with respect to the line light beams and supports the image recording medium, the transparent support plate being located between the image recording medium and the slit array plate. It is preferable that the line light beams, which have passed through adjacent slits, do not overlap each other on the image recording medium.

Further, the read-out scanning exposure apparatus in accordance with the present invention may be modified such that the apparatus further comprises moving means for moving at least either one of the slit array plate and the light irradiating means in the scanning direction in cases where the image information is to be recorded on the image recording medium, such that each of regions of the slit array plate, which regions are other than the slits, is located at a position that intervenes between the image recording medium and one of the line light sources. The slit array plate should preferably be made from a material which does not transmit recording light utilized for the recording of the image information on the image recording medium.

Furthermore, the read-out scanning exposure apparatus in accordance with the present invention may be modified such that the line light sources are electroluminescent light sources.

With the read-out scanning exposure method and apparatus in accordance with the present invention, the light irradiating means is located in association with the image recording medium, the light irradiating means being provided with the plurality of the line light sources, each of which radiates out the line light beam toward the image recording medium. The plurality of the line light sources are located at approximately identical pitches with respect to the scanning direction and in parallel with the longitudinal direction of each of the line light sources. Also, the slit array plate is located between the image recording medium and the light irradiating means, the slit array plate having the plurality of the slits, each of which is located at the position corresponding to the position of one of the line light sources. Further, the light irradiating means is controlled such that the line light beams are radiated out one after another with different timing from the line light sources. Therefore, with the read-out scanning exposure method and apparatus in accordance with the present invention, a spread angle of each of the line light beams, which spread angle is taken with respect to the direction normal to the longitudinal direction of each of the line light sources, is limited by the slit corresponding to each of the line light sources. Accordingly, the line width of each of the line light beams impinging upon the image recording medium is capable of being kept narrow. Also, since the thickness of the slit array plate is smaller than the thickness of the light converging optical system, which is utilized in conventional read-out scanning exposure apparatuses, the size of the read-out scanning exposure apparatus in accordance with the present invention is capable of being kept small.

With the read-out scanning exposure method and apparatus in accordance with the present invention, wherein the transparent protective plate, which is transparent with respect to the line light beams and protects the line light sources, is located between the slit array plate and the light irradiating means, breakage of the line light sources is capable of being prevented from occurring, and the reliability of the read-out scanning exposure apparatus is capable of being enhanced.

In cases where the transparent protective plate is located between the slit array plate and the light irradiating means, each of the line light beams passes through the transparent protective plate and thereafter impinges upon the slit array plate. Therefore, it may occur that a line light beam, which has been radiated out from a certain line light source corresponding to a certain slit, and a line light beam, which has been radiated out from a line light source adjacent to the certain line light source, enter into the certain slit. If the line light beam, which has been radiated out from the line light source adjacent to the certain line light source, is reflected at least one time within the certain slit, the light intensity of the reflected line light beam will become markedly low, and problems will not occur practically. However, if the line light beam, which has been radiated out from the line light source adjacent to the certain line light source, passes through the certain slit without being reflected within the certain slit and impinges upon the image recording medium, the problems will occur in that a signal is read out from a site on the image recording medium, which site is different from the site to be currently exposed to the line light beam having been radiated out from the certain line light source corresponding to the certain slit, and the reliability of the image information having been read out becomes low. Therefore, in cases where the transparent protective plate is located between the slit array plate and the light irradiating means, it is necessary for the slit array plate to have a certain extent of thickness.

How the thickness of the slit array plate may be set, such that the line light beam, which has been radiated out from the line light source adjacent to the certain line light source, is capable of being prevented from passing through the certain slit without being reflected within the certain slit, will be described hereinbelow.

FIG. 11 is an explanatory view showing line light sources 91, 91, . . . , a transparent protective plate 92, and a slit array plate 93. The line light sources 91, 91, . . . extend in the direction normal to the plane of the sheet of FIG. 11 and are arrayed in parallel with one another. Each of slits 94, 94, . . . of the slit array plate 93 is located at the position corresponding to one of the line light sources 91, 91, . . . . The pitch of the line light sources 91, 91, . . . , i.e. the pitch of the slits 94, 94, . . . , is represented by P. The width of each of the line light sources 91, 91, . . . is represented by Wa. The thickness of the transparent protective plate 92 is represented by Te. The refractive index of the transparent protective plate 92 is represented by ne. The refractive index within each of the slits 94, 94, . . . is represented by ns. The width of each of the slits 94, 94, . . . is represented by Wb. The thickness of the slit array plate 93 is represented by Ts. The incidence angle, at which the line light beam having been radiated out from an adjacent line light source 91 and entering a certain sit 94 from an end of the certain slit 94 is incident upon the boundary surface between the certain slit 94 and the transparent protective plate 92, is represented by θe. The refraction angle of the line light beam at the boundary surface is represented by θs. Also, the distance between a reflection point, from which the line light beam is reflected within the certain slit 94, and the bottom of the certain slit 94 is represented by S1. In such cases, the condition, under which the line light beam is reflected at least one time within the certain slit 94, may be represented by Formula (1) shown below.

$$Ts > S1 \tag{1}$$

Also, S1 may be represented by Formula (2) shown below by use of the trigonometric function.

$$S1 = Wb \cdot \tan(90 - \theta s) = \frac{Wb \cdot (1 - \sin^2 \theta s)^{1/2}}{\sin \theta s} \tag{2}$$

Further, from the Snell's law and the Pythagorean theorem, sin θs may be represented by Formula (3) shown below.

$$\sin\theta s = \frac{ne}{ns} \cdot \sin\theta e = \frac{ne \cdot K1}{ns \cdot (Te^2 + K1^2)^{1/2}} \quad (3)$$

wherein K1 may be represented by Formula (4) shown below.

$$K1 = (P - Wb) + \frac{Wb - Wa}{2} \quad (4)$$

From Formula (1), Formula (2), and Formula (3), the thickness Ts of the slit array plate 93 may be calculated with Formula (5) shown below.

$$Ts > \frac{Wb \cdot (ns^2 \cdot Te^2 + ns^2 \cdot K1^2 - ne^2 \cdot K1^2)^{1/2}}{ne \cdot K1} \quad (5)$$

In cases where, for example, ns=1, Wa=Wb=P/2, and at the same time Te>>P, from Formula (4), the thickness Ts of the slit array plate 93 may be calculated with Formula (6) shown below.

$$Ts > \frac{Te}{ne} \quad (6)$$

With the read-out scanning exposure method and apparatus in accordance with the present invention, wherein the transparent support plate, which is transparent with respect to the line light beams and supports the image recording medium, is located between the image recording medium and the slit array plate, breakage of the image recording medium is capable of being prevented from occurring. Also, the image recording medium becomes easy to process, and the reliability of the read-out scanning exposure apparatus is capable of being enhanced. Further, in cases where the transparent support plate is made from an electrical insulating material, the image recording medium is capable of being protected electrically.

In cases where the transparent support plate is located between the image recording medium and the slit array plate, the line light beam, which has passed through each of the slits of the slit array plate, passes through the transparent support plate and thereafter impinges upon the image recording medium. In order for the reliability of an image signal having been read out to be enhanced, it is preferable that the line light beams, which have passed through adjacent slits, do not overlap each other on the image recording medium.

How the thickness of the slit array plate may be set, such that the line light beams, which have passed through adjacent slits, do not overlap each other on the image recording medium, will be described hereinbelow.

FIG. 12 is an explanatory view showing the slit array plate 93 and a transparent support plate 96. The slits 94, 94, . . . extend in the direction normal to the plane of the sheet of FIG. 12 and are arrayed in parallel with one another. The thickness of the transparent support plate 96 is represented by Td. The refractive index of the transparent support plate 96 is represented by nd. The refractive index within each of the slits 94, 94, . . . is represented by ns. The width of each of the slits 94, 94, . . . is represented by Wb. Also, the thickness of the slit array plate 93 is represented by Ts. In such cases, the thickness Ts of the slit array plate 93, which thickness is necessary such that the line light beams, which have passed through adjacent slits 94, 94, do not overlap each other on the image recording medium, may be represented by Formula (7) shown below.

$$Ts > \frac{Wb \cdot (ns^2 \cdot Td^2 + ns^2 \cdot K2^2 - nd^2 \cdot K2^2)^{1/2}}{nd \cdot K2} \quad (7)$$

wherein K2 may be represented by Formula (8) shown below.

$$K2 = \frac{P - Wb}{2} \quad (8)$$

Formula (8) is capable of being obtained with an analysis approximately identical with the analysis for the cases where the transparent protective plate 92 is utilized.

In cases where, for example, ns=1, Wb=P/2, and at the same time Td>>P, from Formula (8), the thickness Ts of the slit array plate 93 may be calculated with Formula (9) shown below.

$$Ts > \frac{2 \cdot Td}{nd} \quad (9)$$

In cases where both the transparent protective plate 92 having the thickness Te and the transparent support plate 96 having the thickness Td are utilized, how the condition, which is necessary such that the adjacent line light beams do not overlap each other on the image recording medium, may be set will be described hereinbelow. The incidence angle, at which the line light beam having been radiated out from a line light source 91 is incident upon the boundary surface between the transparent protective plate 92 and the slit 94, is represented by θe. The incidence angle, at which the line light beam is incident upon the boundary surface between the slit 94 and the transparent support plate 96, is represented by θq. Also, the refraction angle of the line light beam at the boundary surface is represented by θd. In such cases, the condition, which is necessary such that the adjacent line light beams do not overlap each other on the image recording medium, may be represented by Formula (10) shown below.

$$Td \cdot \tan\theta d < \frac{1}{2}(P - Wb) \quad (10)$$

In cases where the conditions of Te>>P and Td>>P are satisfied, the thickness Ts of the slit array plate 93 may be calculated in the manner described below. In cases where the conditions of Te>>P and Td>>P are not satisfied, the thickness Ts of the slit array plate 93 may be calculated with Formula (7) shown above. In cases where the conditions of Te>>P and Td>>P are satisfied, since the incidence angle and the refraction angle are small, the formulas shown below obtain.

$$\tan \theta e \approx \sin \theta e$$

$$\tan \theta q \approx \sin \theta q$$

$$\tan \theta d \approx \sin \theta d$$

By the utilization of the Snell's law for Formula (10), the thickness Ts of the slit array plate 93 may be represented by Formula (11) shown below.

$$Ts > \frac{(Wa+Wb) \cdot Td \cdot ns}{(P-Wb) \cdot nd} - \frac{Te \cdot ns}{ne} \qquad (11)$$

In cases where, for example, ns=1, and Wa=Wb=P/2, from Formula (11), the thickness Ts of the slit array plate 93 may be calculated with Formula (12) shown below.

$$Ts > \frac{2 \cdot Td}{nd} - \frac{Te}{ne} \qquad (12)$$

Further, the read-out scanning exposure method and apparatus in accordance with the present invention may be modified such that, in cases where the image information is to be recorded on the image recording medium, at least either one of the slit array plate and the light irradiating means is moved in the scanning direction, such that each of regions of the slit array plate, which regions are other than the slits, is located at the position that intervenes between the image recording medium and one of the line light sources. With the modifications described above, the problems do not occur in that the line light sources are exposed to recording light, which is utilized at the time of the recording of the image information on the image recording medium. Therefore, the line light sources are capable of being prevented from being adversely affected by the recording light.

With the read-out scanning exposure method and apparatus in accordance with the present invention, wherein the EL light sources are utilized as the line light sources, the cost of the read-out scanning exposure apparatus is capable of being kept low.

DESCRIPTION OF THE PREFERRED EMBODIMENTS

The present invention will hereinbelow be described in further detail with reference to the accompanying drawings.

Figure 1:
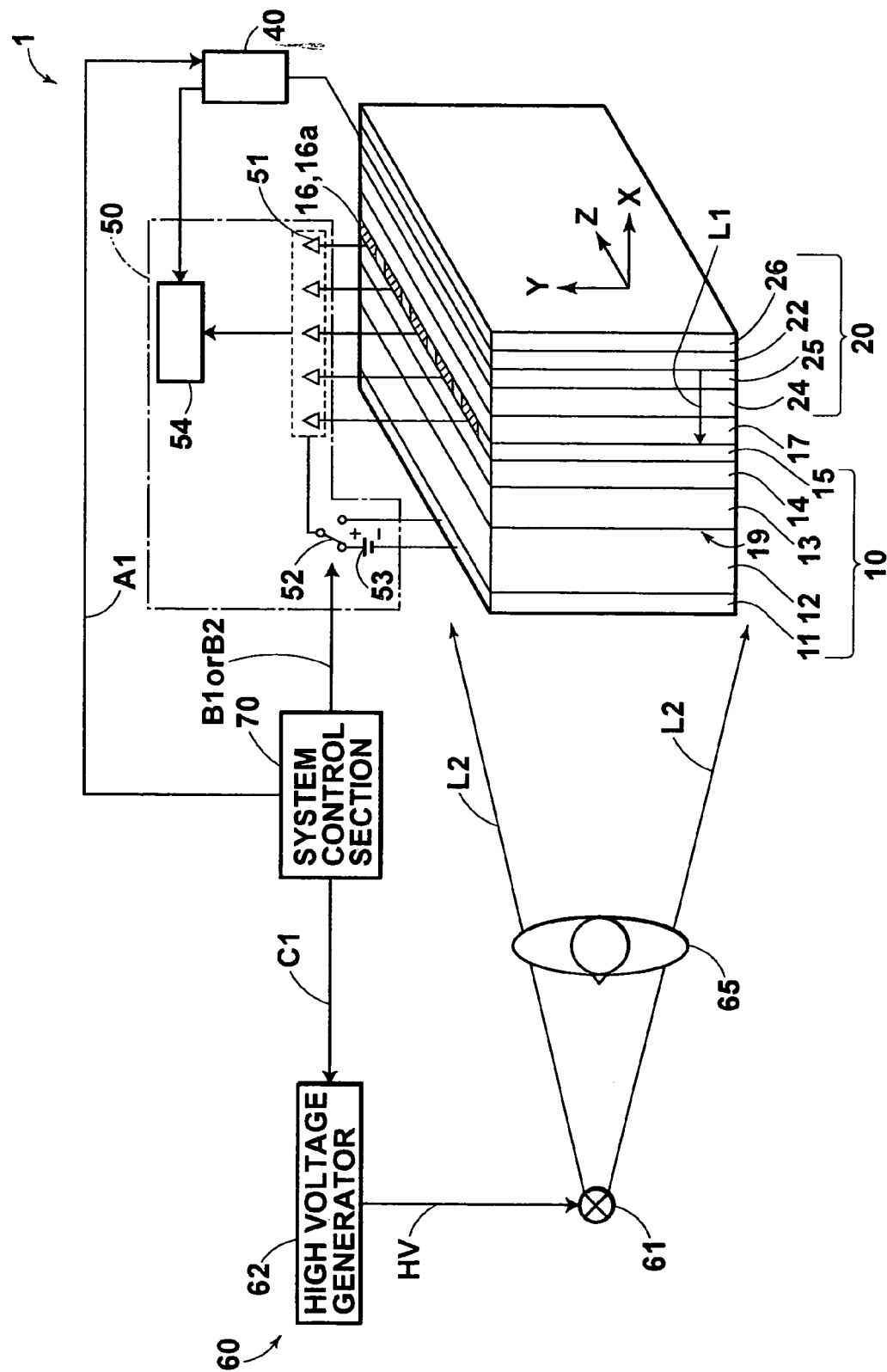
FIG. 1 is a schematic view showing an image information recording and read-out system, in which a first embodiment of the read-out scanning exposure apparatus in accordance with the present invention is employed.

FIG. 1 is a schematic view showing an image information recording and read-out system, in which a first embodiment of the read-out scanning exposure apparatus in accordance with the present invention is employed. As illustrated in FIG. 1, an image information recording and read-out system 1 comprises an image recording medium 10, which is capable of recording an electrostatic latent image having a size of 400 mm×400 mm thereon. The image information recording and read-out system 1 also comprises a scanning exposure section 20, which performs scanning exposure of the image recording medium 10 with reading light beams L1, L1, . . . . The image information recording and read-out system 1 further comprises a scanning exposure control section 40, which controls an operation of the scanning exposure section 20. The image information recording and read-out system 1 still further comprises a reading section 50, which reads image information from the image recording medium 10. The image information recording and read-out system 1 also comprises a radiation irradiating section 60, which irradiates radiation L2 acting as recording light toward the image recording medium 10. The image information recording and read-out system 1 further comprises a system control section 70, which is connected to the scanning exposure control section 40, the reading section 50, and the radiation irradiating section 60.

The image recording medium 10 comprises a first electrode layer (an electrical conductor layer) 11, a recording photo-conductive layer 12, a charge transporting layer 13, a reading photo-conductive layer 14, and a second electrode layer (an electrical conductor layer) 15. In cases where the radiation L2 (e.g., X-rays), which carries image information of an object, is irradiated to the first electrode layer 11, electric charges occur within the recording photo-conductive layer 12. The electric charges, which have occurred within the recording photo-conductive layer 12, are accumulated as latent image charges at a charge accumulating section 19, which constitutes the interface between the recording photo-conductive layer 12 and the charge transporting layer 13. In cases where the second electrode layer 15 is then scanned with each of the reading light beams L1, L1, . . . , electric charges occur within the reading photo-conductive layer 14. The electric charges, which have occurred within the reading photo-conductive layer 14, undergo charge re-combination with the latent image charges described above. As a result, electric currents in accordance with the amounts of the latent image charges occur. A glass base plate 17, which has a thickness of 0.7 mm and acts as the transparent support plate capable of transmitting the reading light beams L1, L1, . . . , is located on the side outward from the second electrode layer 15.

The second electrode layer 15 comprises a plurality of linear electrodes (hatched in FIG. 1), which are arrayed in a striped pattern. The electrode of the second electrode layer 15 will hereinbelow be referred to as the striped electrode 16. Also, the linear electrodes constituting the striped electrode 16 will hereinbelow be referred to as elements 16a, 16a, . . . . Each of the recording photo-conductive layer 12, the charge transporting layer 13, and the reading photo-conductive layer 14 contains amorphous selenium (a-Se) as a principal constituent. As illustrated in FIG. 1, the direction, in which the recording photo-conductive layer 12, the charge transporting layer 13, the reading photo-conductive layer 14, the second electrode layer 15, and the glass base plate 17 are laminated together, is taken as the X direction. Also, the longitudinal direction of the striped electrode 16 is taken as the Y direction. Further, the direction, which is normal to the XY plane, is taken as the Z direction.

Figure 2:
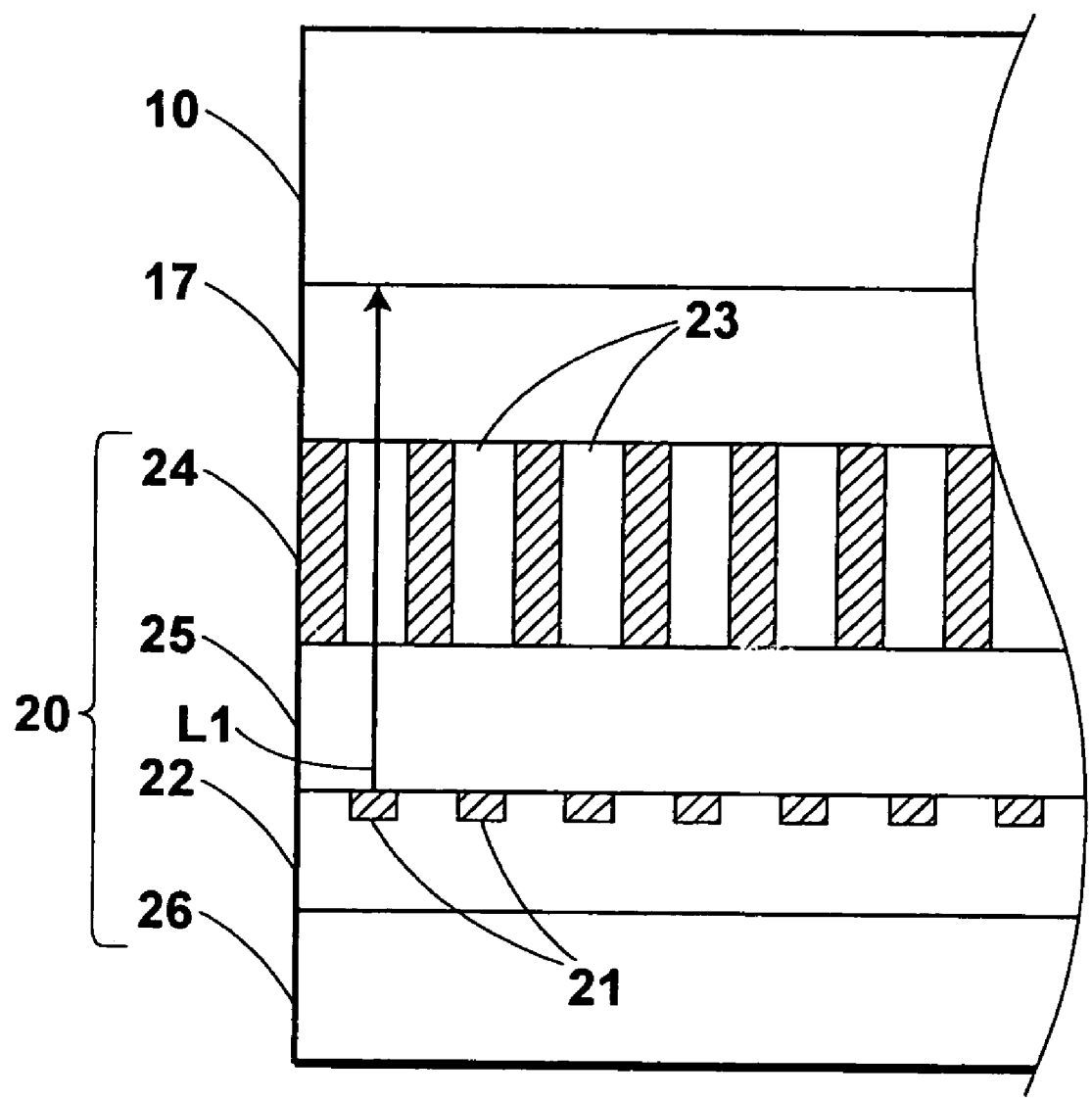
FIG. 2 is a partial sectional view showing a scanning exposure section and a slit array plate employed in the first embodiment of the read-out scanning exposure apparatus shown in FIG. 1.

FIG. 2 is a partial sectional view showing the scanning exposure section 20, which sectional view is taken along the XY plane. As illustrated in FIG. 2, the scanning exposure section 20 comprises a panel-shaped light irradiating section 22. The panel-shaped light irradiating section 22 is provided with 4,000 line light sources 21, 21, . . . , which extend in the Z direction and are arrayed in parallel with one another. The scanning exposure section 20 also comprises a slit array plate 24, which has a thickness of 1 mm. The slit array plate 24 is provided with 4,000 slits 23, 23, . . . , which extend in the Z direction and are arrayed in parallel with one another. The scanning exposure section 20 further comprises a glass base plate 25, which is located between the slit array plate 24 and the panel-shaped light irradiating section 22. The glass base plate 25 has a thickness of 0.7 mm and acts as the transparent protective plate. The scanning exposure section 20 still further comprises a glass base plate 26, which has a thickness of 0.7 mm and is located on the side outward from the panel-shaped light irradiating section 22. The image recording medium 10, the glass base plate 17, the slit array plate 24, the glass base plate 25, the panel-shaped light irradiating section 22, and the glass base plate 26 are combined into an integral body. Also, the slit array plate 24 is made from stainless steel and is grounded.

Figure 3A:
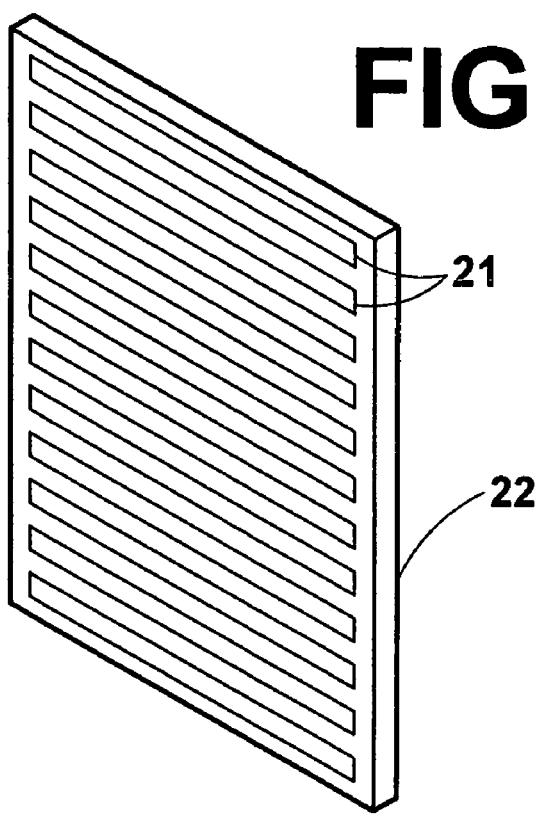
FIG. 3A is a schematic view showing a panel-shaped light irradiating section employed in the first embodiment of the read-out scanning exposure apparatus shown in FIG. 1.
Figure 3B:
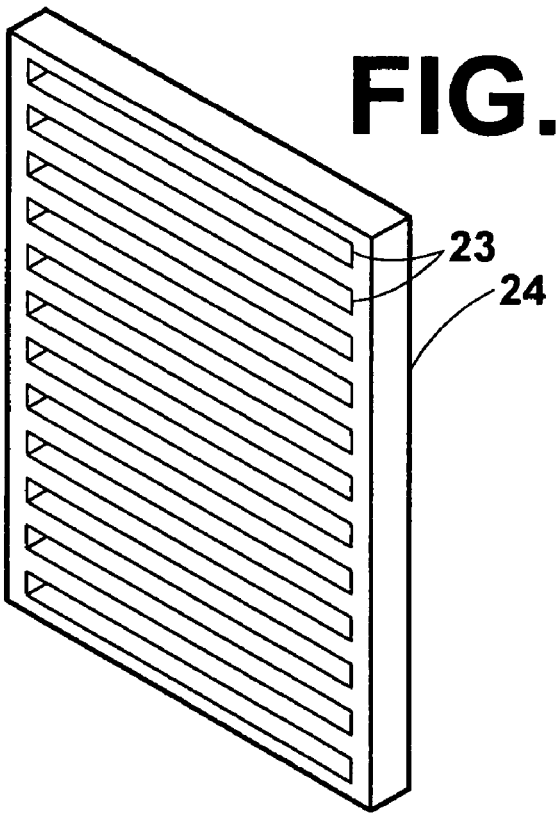
FIG. 3B is a schematic view showing the slit array plate employed in the first embodiment of the read-out scanning exposure apparatus shown in FIG. 1.

FIG. 3A is a schematic view showing the panel-shaped light irradiating section 22. As illustrated in FIG. 3A, the panel-shaped light irradiating section 22 is provided with the 4,000 line light sources 21, 21, . . . , which are located at pitches of 100 µm. Each of the line light sources 21, 21, . . . is constituted of an EL light source having a width of 50 µm and a length of 400 mm. FIG. 3B is a schematic view showing the slit array plate 24. As illustrated in FIG. 3B, the slit array plate 24 is provided with the 4,000 slits 23, 23, . . . , which are located at pitches of 100 µm. Each of the slits 23, 23, . . . has a width of 50 µm and a length of 400 mm. Each of the slits 23, 23, . . . is located at the position corresponding to one of the line light sources 21, 21, . . . . The reading light beam L1, which has been radiated out from each of the line light sources 21, 21, . . . , passes through the glass base plate 25. The reading light beam L1 then passes through the corresponding slit 23, and the spread angle of the reading light beam L1 with respect to the Y direction is limited by the slit 23. Thereafter, the reading light beam L1 passes through the glass base plate 17 and impinges upon the image recording medium 10.

In cases where the scanning exposure control section 40 receives a control signal A1, which instructs the read-out scanning operation, from the system control section 70, the scanning exposure control section 40 actuates the line light sources 21, 21, . . . of the panel-shaped light irradiating section 22 one after another to radiate out the reading light beams L1, L1, . . . with different timing.

The reading section 50 comprises a plurality of current detection amplifiers 51, 51, . . . , which are connected to inversion input terminals. Each of the current detection amplifiers 51, 51, . . . is provided for one of the elements 16a, 16a, . . . of the striped electrode 16. The first electrode layer 11 of the image recording medium 10 is connected to one of input terminals of a switch 52 and to a negative pole of an electric power source 53. A positive pole of the electric power source 53 is connected to the other input terminal of the switch 52. An output terminal of the switch 52 is connected commonly to each of non-inversion input terminals of operational amplifiers (not shown), each of which constitutes one of the current detection amplifiers 51, 51, . . . .

At the time of the read-out scanning, each of the reading light beams L1, L1, . . . is irradiated toward the striped electrode 16 for the scanning exposure, and each of the current detection amplifiers 51, 51, . . . detects the electric current flowing across the corresponding one of the elements 16a, 16a, . . . . The current detection amplifiers 51, 51, . . . thus detects the electric currents simultaneously (i.e., in a parallel manner) with respect to the elements 16a, 16a, . . . . The results of the detection are outputted into a signal processing section 54. The signal processing section 54 successively receives exposed site information, which represents the site exposed to each of the reading light beams L1, L1, . . . , from the scanning exposure control section 40. Also, the signal processing section 54 stores the detection results, which have been received from the current detection amplifiers 51, 51, . . . , and the corresponding exposed site information. After the read-out scanning has been finished, the signal processing section 54 forms an image signal, which represents one image, in accordance with the detection results and the exposed site information.

The current detection amplifiers 51, 51, . . . may have one of various known constitutions. The manner in which the current detection amplifiers 51, 51, . . . are connected to the switch 52, the electric power source 53, and the elements 16a, 16a, . . . may vary for different constitutions of the current detection amplifiers 51, 51, . . . . In this embodiment, in cases where a control signal B1 for instructing an image recording operation is received from the system control section 70, the connection of the switch 52 is changed over to the side of the electric power source 53. Also, in cases where a control signal B2 for instructing a read-out operation is received from the system control section 70, the connection of the switch 52 is changed over to the side of the first electrode layer 11.

The radiation irradiating section 60 comprises a radiation source 61, which produces the radiation L2, and a high voltage generator 62, which produces electric power for actuating the radiation source 61.

In cases where a control signal C1 for instructing a radiation irradiating operation is fed from the system control section 70 into the high voltage generator 62, the high voltage generator 62 applies a high voltage HV to the radiation source 61 and actuates the radiation source 61 to produce the radiation L2 for a predetermined period of time.

The system control section 70 outputs the control signal A1, which instructs the scanning exposure operation, to the scanning exposure control section 40. Also, the system control section 70 outputs the control signal B1, which instructs the image information recording operation, or the control signal B2, which instructs the image information read-out operation, to the switch 52. Further, the system control section 70 outputs the control signal C1, which instructs the operation for irradiating the radiation L2, to the high voltage generator 62.

How the image information recording and read-out system 1 having the constitution described above operates will be described hereinbelow.

When the electrostatic latent image is to be recorded on the image recording medium 10, the voltage for the recording is applied across the electrode of the first electrode layer 11 and the striped electrode 16. Also, in this state, the radiation L2 for the recording is irradiated to the first electrode layer 11, and the electrostatic latent image is recorded on the image recording medium 10. Specifically, firstly, the system control section 70 outputs the control signal B1 to the switch 52, such that the electric charges occurring in the recording photo-conductive layer 12 of the image recording medium 10 are capable of being accumulated at the charge accumulating section 19. When the control signal B1 is received from the system control section 70, the connection of the switch 52 is changed over to the side of the electric power source 53, and a d.c. voltage of a predetermined level is applied as the recording voltage from the electric power source 53 across the electrode of the first electrode layer 11 and the striped electrode 16 of the image recording medium 10. As a result, the electrode of the first electrode layer 11 and the striped electrode 16 are electrostatically charged.

After the recording voltage has been applied across the electrode of the first electrode layer 11 and the striped electrode 16 of the image recording medium 10, the system control section 70 inputs the control signal C1 into the high voltage generator 62 and actuates the high voltage generator 62 to supply the high voltage HV to the radiation source 61. The radiation L2 is thus produced by the radiation source 61. The thus produced radiation L2 is irradiated to an object 65 and passes through the object 65. The radiation L2, which carries the radiation image information of the object 65, is irradiated to the image recording medium 10 for a predetermined irradiation time. As a result, pairs of positive and negative charges occur in the recording photo-conductive layer 12 of the image recording medium 10. Of the pairs of positive and negative charges, the negative charges are centralized upon the elements 16a, 16a, . . . of the striped electrode 16 along a predetermined electric field distribution. In this manner, the negative charges are accumulated as the latent image charges at the charge accumulating section 19, which is the interface between the recording photo-conductive layer 12 and the charge transporting layer 13. The amount of the accumulated latent image charges is approximately in proportion to the dose of radiation delivered to the image recording medium 10. Therefore, the latent image charges carry the electrostatic latent image. The positive charges occurring in the recording photo-conductive layer 12 are attracted to the first electrode layer 11, combine with negative charges injected from the electric power source 53, and disappear.

When the electrostatic latent image is to be read out from the image recording medium 10, the system control section 70 outputs the control signal B2 to the switch 52 in order to set the electrode of the first electrode layer 11 and the striped electrode 16 at an identical electric potential. Thereafter, the system control section 70 outputs the control signal A1 to the scanning exposure control section 40. In accordance with the control signal A1, the scanning exposure control section 40 turns on the line light source 21, which is located at the top in FIG. 1, for a period of 10 µs. The reading light beam L1, which has been produced by the line light source 21, passes through the slit 23 of the slit array plate 24, which slit corresponds to the line light source 21, and the spread angle of the reading light beam L1 with respect to the Y direction is limited by the slit 23. The reading light beam L1 is thus irradiated to the image recording medium 10. Thereafter, in the same manner, the reading light beams L1, L1, . . . are successively irradiated from the lower adjacent line light sources 21, 21, . . . to the image recording medium 10 for a period of 10 µs. Lastly, the reading light beam L1 is irradiated from the bottom line light source 21, to the image recording medium 10 for a period of 10 µs. The scanning exposure of the image recording medium 10 with the reading light beams L1, L1, . . . is thus completed.

At the time at which the image recording medium 10 is scanned with each of the reading light beams L1, L1, . . . , pairs of positive and negative charges occur in the region of the reading photo-conductive layer 14, which region has been exposed to the reading light beam L1 corresponding to the scanning position. Of the pairs of positive and negative charges, the positive charges move quickly through the charge transporting layer 13 so as to be attracted by the negative charges (the latent image charges), which have been accumulated at the charge accumulating section 19. The positive charges combine with the latent image charges at the charge accumulating section 19 and disappear. The negative charges occurring in the reading photo-conductive layer 14 combine with positive charges, which are injected from the electric power source 53 into the striped electrode 16, and disappear. In this manner, the negative charges having been accumulated at the charge accumulating section 19 of the image recording medium 10 disappear through charge re-combination, and electric currents due to the movement of the electric charges at the time of the charge re-combination occur in the image recording medium 10. The electric currents are detected simultaneously by the current detection amplifiers 51, 51, . . . , each of which is connected to one of the elements 16a, 16a, . . . . The results of the detection are fed from the current detection amplifiers 51, 51, . . . into the signal processing section 54.

The electric currents flowing through the image recording medium 10 at the time of the readout occur in accordance with the latent image charges, i.e. the electrostatic latent image. Therefore, the electrostatic latent image is capable of being read out, i.e. an image signal representing the electrostatic latent image is capable of being acquired, through the detection of the electric currents. The detection of the electric currents with the current detection amplifiers 51, 51, . . . is performed by being interlocked with the timing with which the positions of irradiation of the reading light beams L1, L1, . . . are changed over, i.e. the timing with which the line light sources 21, 21, . . . are changed over. The image signal corresponding to 4,000 lines is thus acquired.

After the scanning exposure operation has been completed, the signal processing section 54 forms the image information, which represents one image, in accordance with the detection result (i.e., the image signal).

As described above, with the scanning exposure section 20 employed in this embodiment, the spread angle of the reading light beam L1, which is radiated out from each of the line light sources 21, 21, . . . of the panel-shaped light irradiating section 22, with respect to the Y direction is limited by the corresponding slit 23 of the slit array plate 24. Therefore, the line width of the reading light beam L1 impinging upon the image recording medium 10 is capable of being kept narrow. Also, the thickness of the slit array plate 24 is 1 mm and is thinner than the thickness of the conventionally utilized light converging optical system. Accordingly, the scanning exposure section 20 is capable of being small in size.

Further, since the glass base plate 25 is located between the slit array plate 24 and the panel-shaped light irradiating section 22, breakage of the line light sources 21, 21, . . . is capable of being prevented from occurring, and the reliability of the read-out scanning exposure apparatus is capable of being enhanced.

Furthermore, the image recording medium 10 is provided with the glass base plate 17. Therefore, the image recording medium 10 is easy to produce. Also, by the provision of the glass base plate 17, the image recording medium 10 is capable of being prevented from breaking and is capable of being protected electrically. Accordingly, the reliability of the read-out scanning exposure apparatus is capable of being enhanced even further. Further, the image recording medium 10 becomes easy to process.

Furthermore, the glass base plate 17 and the glass base plate 25 are located on opposite sides of the slit array plate 24. The refractive index in the slits 23, 23, . . . is equal to 1. The refractive index of each of the glass base plate 17 and the glass base plate 25 is equal to approximately 1.5. Also, the width of each of the slits 23, 23, . . . and the width of each of the line light sources 21, 21, . . . are equal to each other and are equal to the value of slit pitch/2. Further, the thickness (0.7 mm) of the glass base plate 17 and the thickness (0.7 mm) of the glass base plate 25 are larger than the slit pitch (100 µm). Therefore, the thickness of the slit array plate 24 necessary for preventing a reading light beam L1, which has been radiated out from a line light source 21 adjacent to a certain line light source 21, from passing through the certain slit 23 corresponding to the certain line light source 21 without being reflected within the certain slit 23 is at least 0.7/1.5≈0.47 mm. Also, the thickness of the slit array plate 24 necessary for preventing the reading light beams L1, L1, which have passed through adjacent slits 23, 23, from overlapping each other on the image recording medium 10 is at least (2·0.7)/1.5-0.7/1.5≈0.47 mm. In this embodiment, the slit array plate having a thickness of 1 mm is employed as the slit array plate 24. Therefore, the problems are capable of being prevented from occurring in that a reading light beam L1, which has been radiated out from a line light source 21 adjacent to a certain line light source 21, passes through the certain slit 23 corresponding to the certain line light source 21 without being reflected within the certain slit 23. Also, the problems are capable of being prevented from occurring in that the reading light beams L1, L1, which have passed through adjacent slits 23, 23, overlap each other on the image recording medium 10. Accordingly, the reliability of the acquired image information is capable of being enhanced.

Further, if the image recording medium 10 and the panel-shaped light irradiating section 22 are located as two independent members, there will be the risk that structural warpage will occur. However, with the read-out scanning exposure apparatus employed in the image information recording and read-out system 1, the image recording medium 10 and the panel-shaped light irradiating section 22 are combined with the slit array plate 24, which is made from stainless steel and has a thickness of 1 mm, into an integral body. Therefore, the read-out scanning exposure apparatus is free from the problems concerning warpage, and the reliability of the read-out scanning exposure apparatus is capable of being enhanced.

Furthermore, since the slit array plate 24 is grounded, shielding effects are capable of being obtained. Therefore, adverse effects of electric noise due to the actuating electric currents for the line light sources 21, 21, . . . of the panel-shaped light irradiating section 22 upon the image recording medium 10 are capable of being suppressed.

Figure 4:
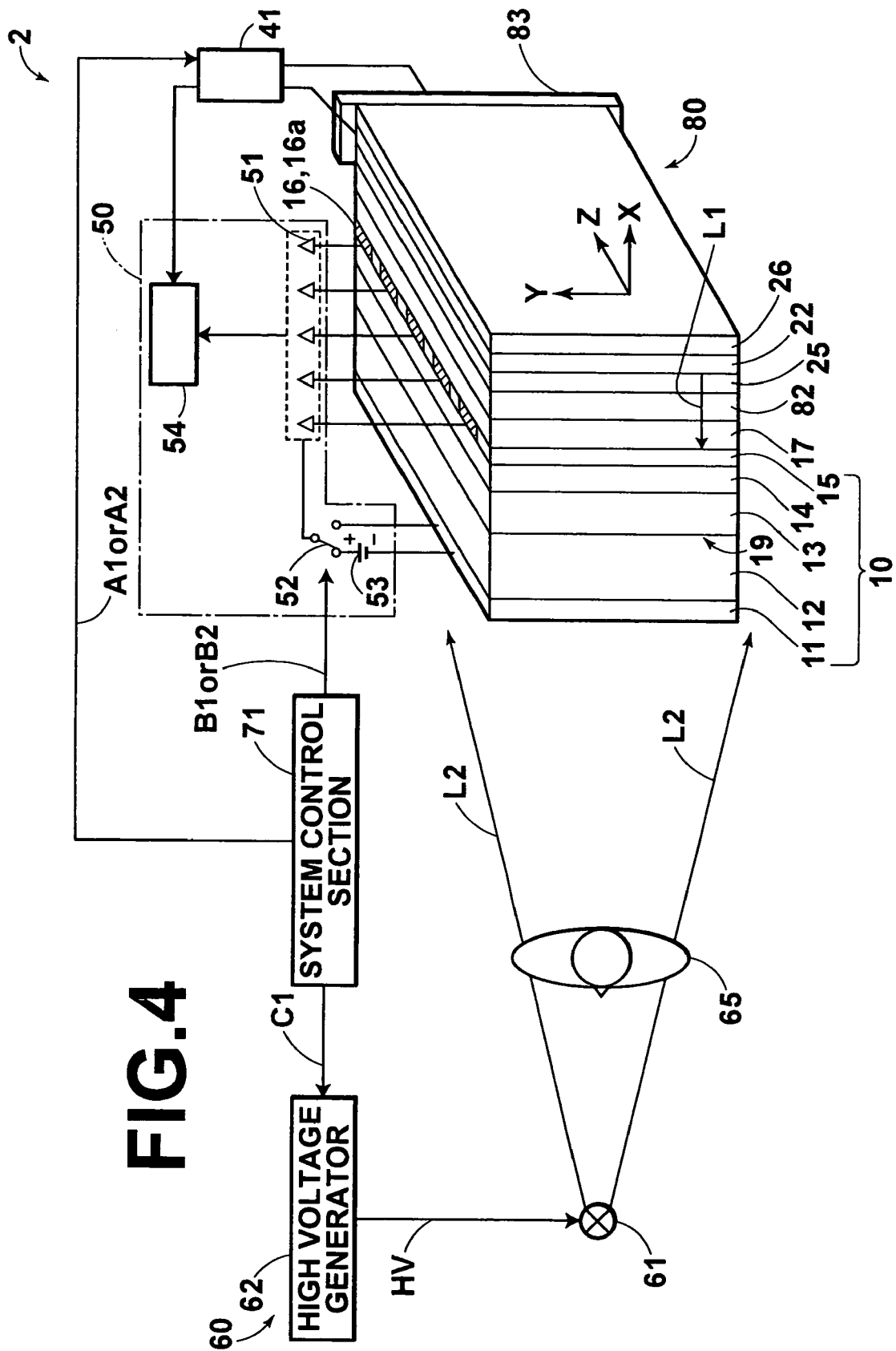
FIG. 4 is a schematic view showing an image information recording and read-out system, in which a second embodiment of the read-out scanning exposure apparatus in accordance with the present invention is employed.

An image information recording and read-out system, in which a second embodiment of the read-out scanning exposure apparatus in accordance with the present invention is employed, will be described hereinbelow with reference to FIG. 4 to FIG. 9. FIG. 4 is a schematic view showing an image information recording and read-out system, in which a second embodiment of the read-out scanning exposure apparatus in accordance with the present invention is employed. In FIG. 4, similar elements are numbered with the same reference numerals with respect to FIG. 1.

As illustrated in FIG. 4, an image information recording and read-out system 2 comprises the image recording medium 10. The image information recording and read-out system 2 also comprises a scanning exposure section 80, which performs the scanning exposure of the image recording medium 10 with the reading light beams L1, L1, . . . . The image information recording and read-out system 2 further comprises a scanning exposure control section 41, which controls an operation of the scanning exposure section 80. The image information recording and read-out system 2 still further comprises the reading section 50. The image information recording and read-out system 2 also comprises the radiation irradiating section 60, which irradiates the radiation L2 acting as the recording light toward the image recording medium 10. The image information recording and read-out system 2 further comprises a system control section 71, which is connected to the scanning exposure control section 41, the reading section 50, and the radiation irradiating section 60.

Figure 5:
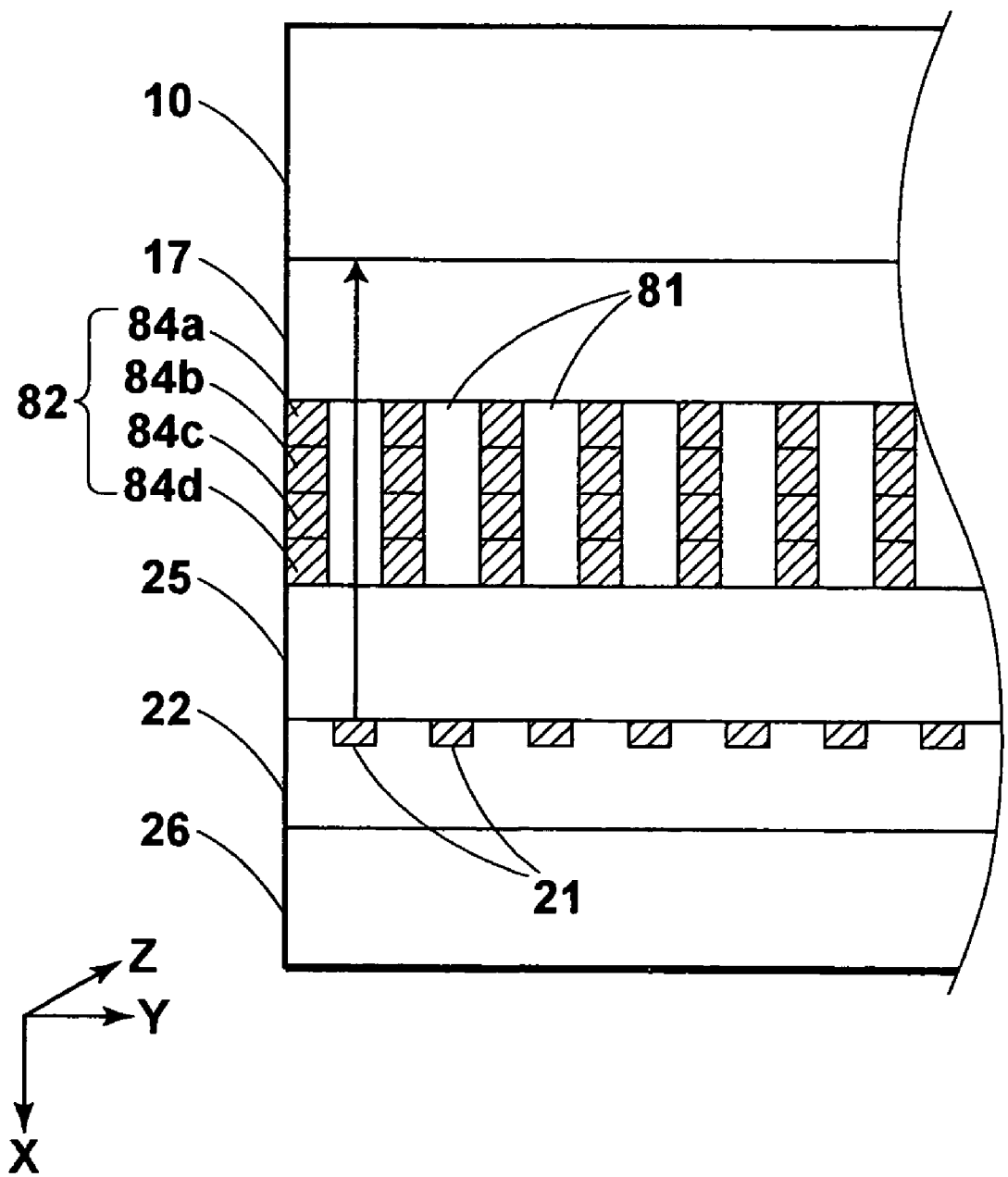
FIG. 5 is a partial sectional view showing a scanning exposure section and a slit array plate employed in the second embodiment of the read-out scanning exposure apparatus shown in FIG. 4, FIGS. 6A and 6B are schematic views showing slit array thin plates employed in the second embodiment of the read-out scanning exposure apparatus shown in FIG. 4.

FIG. 5 is a partial sectional view showing the scanning exposure section 80, which sectional view is taken along the XY plane. As illustrated in FIG. 5, the scanning exposure section 80 comprises the panel-shaped light irradiating section 22. The panel-shaped light irradiating section 22 is provided with the 4,000 line light sources 21, 21, . . . , which extend in the Z direction and are arrayed in parallel with one another. The scanning exposure section 80 also comprises a slit array plate 82, which has a thickness of 1 mm. The slit array plate 82 is provided with 4,000 slits 81, 81, . . . , which extend in the Z direction and are arrayed in parallel with one another. The scanning exposure section 80 further comprises the glass base plate 25, which is located between the slit array plate 82 and the panel-shaped light irradiating section 22. The glass base plate 25 has a thickness of 0.7 mm. The scanning exposure section 80 still further comprises the glass base plate 26, which has a thickness of 0.7 mm and is located on the side outward from the panel-shaped light irradiating section 22. The scanning exposure section 80 also comprises a moving section 83 for moving the glass base plate 25, the panel-shaped light irradiating section 22, and the glass base plate 26 in the Y direction. The image recording medium 10, the glass base plate 17, and the slit array plate 82 are combined into an integral body. Also, the glass base plate 25, the panel-shaped light irradiating section 22, and the glass base plate 26 are combined into an integral body. The slit array plate 82 is grounded.

FIGS. 6A and 6B are schematic views showing slit array thin plates constituting the slit array plate 82. As illustrated in FIG. 6A, the slit array plate 82 comprises three slit array thin plates 84a, 84b, and 84c, each of which has a thickness of 0.25 mm. As illustrated in FIG. 6B, the slit array plate 82 also comprises a slit array thin plate 84d having a thickness of 0.25 mm. The slit array thin plates 84a, 84b, 84c, and 84d are laminated together and grounded. Each of the slit array thin plates 84a, 84b, 84c, and 84d is made from stainless steel.

The slit array thin plate 84a is provided with 4,000 slits 85a, 85a, . . . , which are located at pitches of 100 µm. Each of the slits 85a, 85a, . . . has a width of 50 µm and a length of 400 mm. The slit array thin plate 84b is provided with 4,000 slits 85b, 85b, . . . , which are located at pitches of 100 µm. Each of the slits 85b, 85b, . . . has a width of 50 µm and a length of 400 mm. Also, the slit array thin plate 84c is provided with 4,000 slits 85c, 85c, . . . , which are located at pitches of 100 µm. Each of the slits 85c, 85c, . . . has a width of 50 µm and a length of 400 mm. Further, the slit array thin plate 84d is provided with 4,000 slits 85d, 85d, . . . , which are located at pitches of 100 µm. Each of the slits 85d, 85d, . . . has a width of 50 µm and a length of 400 mm. Also, each of the slits 85d, 85d, . . . is provided with bridges 86, 86, . . . extending in the direction normal to the longitudinal direction of the slit. The bridges 86, 86, . . . are located at pitches of 100 µm. The slit array thin plates 84a, 84b, 84c, and 84d are laminated such that the position of each of the slits 85a, 85a, . . . of the slit array thin plate 84a, the position of each of the slits 85b, 85b, . . . of the slit array thin plate 84b, the position of each of the slits 85c, 85c, . . . of the slit array thin plate 84c, and the position of each of the slits 85d, 85d, . . . of the slit array thin plate 84d may coincide with one another. The slit array plate 82 is located such that each of the slits 81, 81, . . . stands facing one of the line light sources 21, 21, . . . . The reading light beam L1, which has been radiated out from each of the line light sources 21, 21, . . . , passes through the glass base plate 25. The reading light beam L1 then passes through the corresponding slit 81, and the spread angle of the reading light beam L1 with respect to the Y direction is limited by the slit 81. Thereafter, the reading light beam L1 passes through the glass base plate 17 and impinges upon the image recording medium 10.

In cases where the scanning exposure control section 41 receives the control signal A1, which instructs the read-out scanning operation, from the system control section 71, the scanning exposure control section 41 actuates the line light sources 21, 21, . . . of the panel-shaped light irradiating section 22 one after another to radiate out the reading light beams L1, L1, . . . with different timing. Also, in cases where the scanning exposure control section 41 receives a control signal A2, which instructs the image information recording operation, from the system control section 71, the scanning exposure control section 41 actuates the moving section 83 to move the glass base plate 25, the panel-shaped light irradiating section 22, and the glass base plate 26 by a distance of 50 µm in the Y direction.

The system control section 71 outputs the control signal A1, which instructs the scanning exposure operation, or the control signal A2, which instructs the image information recording operation, to the scanning exposure control section 41. Also, the system control section 71 outputs the control signal B1, which instructs the image information recording operation, or the control signal B2, which instructs the image information read-out operation, to the switch 52. Further, the system control section 71 outputs the control signal C1, which instructs the operation for irradiating the radiation L2, to the high voltage generator 62.

How the image information recording and read-out system 2 having the constitution described above operates will be described hereinbelow.

When the electrostatic latent image is to be recorded on the image recording medium 10, the system control section 71 outputs the control signal B1 to the switch 52 and outputs the control signal A2 to the scanning exposure control section 41. When the control signal B1 is received from the system control section 71, the connection of the switch 52 is changed over to the side of the electric power source 53, and the d.c. voltage of the predetermined level is applied as the recording voltage from the electric power source 53 across the electrode of the first electrode layer 11 and the striped electrode 16 of the image recording medium 10. As a result, the electrode of the first electrode layer 11 and the striped electrode 16 are electrostatically charged. When the control signal A2, which instructs the image information recording operation, is received from the system control section 71, the scanning exposure control section 41 actuates the moving section 83 to move the glass base plate 25, the panel-shaped light irradiating section 22, and the glass base plate 26 by a distance of 50 µm in the Y direction.

Figure 7:
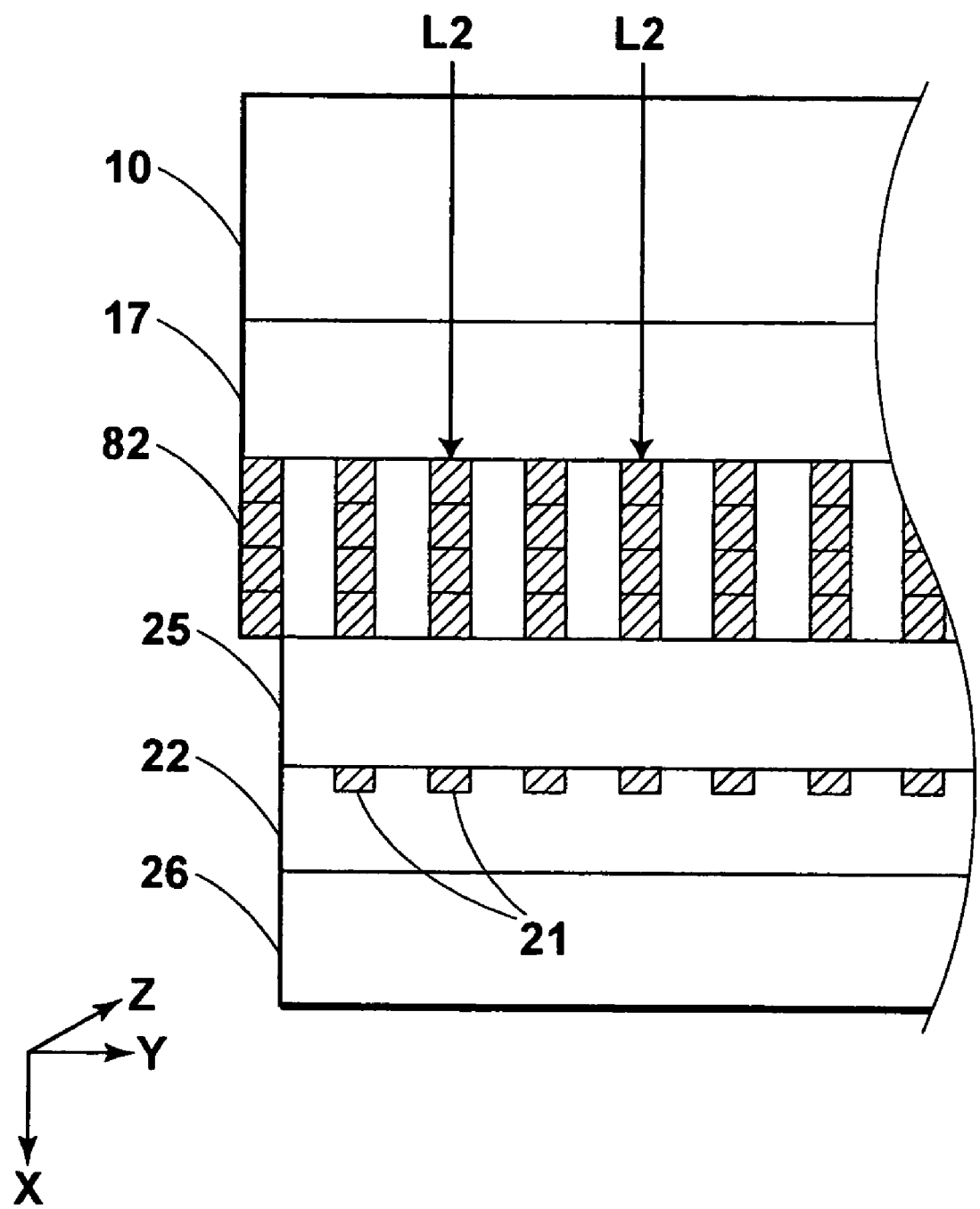
FIG. 7 is a partial sectional view showing the scanning exposure section and the slit array plate after being moved at the time of recording of image information on an image recording medium in the second embodiment of the read-out scanning exposure apparatus shown in FIG. 4.

Thereafter, the system control section 71 inputs the control signal C1 into the high voltage generator 62 and actuates the high voltage generator 62 to supply the high voltage HV to the radiation source 61. The radiation L2 is thus produced by the radiation source 61. The thus produced radiation L2 is irradiated to the object 65 and passes through the object 65. The radiation L2, which carries the radiation image information of the object 65, is irradiated to the image recording medium 10 for a predetermined irradiation time. At this time, as illustrated in FIG. 7, part of the radiation L2 is blocked by the plate regions of the slit array plate 82 and does not impinge upon the line light sources 21, 21, . . . of the panel-shaped light irradiating section 22.

When the electrostatic latent image is to be read out from the image recording medium 10, the system control section 71 outputs the control signal B2 to the switch 52 in order to set the electrode of the first electrode layer 11 and the striped electrode 16 at an identical electric potential. Thereafter, the system control section 71 outputs the control signal A1 to the scanning exposure control section 41. In accordance with the control signal A1, firstly, the scanning exposure control section 41 actuates the moving section 83 to move the glass base plate 25, the panel-shaped light irradiating section 22, and the glass base plate 26 by a distance of 50 µm in the direction reverse to the direction at the time of the image information recording operation. As a result, each of the slits 81, 81, . . . stands facing the corresponding one of the line light sources 21, 21, . . . . Thereafter, the scanning exposure control section 41 turns on the line light sources 21, 21, . . . one after another for a period of 10 µs. The scanning exposure of the image recording medium 10 with the reading light beams L1, L1, . . . is thus performed. The image information is then read out from the image recording medium 10 in the same manner as that for the image information recording and read-out system 1 described above.

As described above, with the scanning exposure section 80 employed in this embodiment, the spread angle of the reading light beam L1, which is radiated out from each of the line light sources 21, 21, . . . of the panel-shaped light irradiating section 22, with respect to the Y direction is limited by the corresponding slit 81 of the slit array plate 82. Therefore, the line width of the reading light beam L1 impinging upon the image recording medium 10 is capable of being kept narrow. Also, the thickness of the slit array plate 82 is 1 mm and is thinner than the thickness of the conventionally utilized light converging optical system. Accordingly, the scanning exposure section 80 is capable of being small in size.

Further, in cases where the image information recording operation is to be performed, the moving section 83 moves the glass base plate 25, the panel-shaped light irradiating section 22, and the glass base plate 26 by a distance of 50 µm in the Y direction. As a result, part of the radiation L2 is blocked by the plate regions of the slit array plate 82 and does not impinge upon the line light sources 21, 21, . . . of the panel-shaped light irradiating section 22. Therefore, the problems are capable of being prevented from occurring in that the line light sources 21, 21, . . . are exposed to the radiation L2 and deteriorate.

A slit array thin plate having a thickness of several hundreds of microns is capable of being produced at a low cost by use of a known chemical etching technique, a known ion etching technique, or the like. However, it is not always possible to produce a slit array plate having a thickness of 1 mm by use of the etching technique. Therefore, ordinarily, a slit array plate having a thickness of at least 1 mm is produced by use of a wire cut technique utilizing electrical discharging, or the like, and the cost of the slit array plate is not capable of being kept low. The slit array plate 82 employed in this embodiment is constituted by laminating the slit array thin plates 84a, 84b, 84c, and 84d, each of which has a thickness of 250 µm. The slit array thin plates 84a, 84b, 84c, and 84d constituting the slit array plate 82 are capable of being produced with the etching technique, or the like. Therefore, the cost of the slit array plate 82 is capable of being kept low.

Also, each of the slits 85d, 85d, . . . of the slit array thin plate 84d is provided with the bridges 86, 86, . . . extending in the Y direction. Therefore, the shielding effects are capable of being enhanced. Accordingly, adverse effects of electric noise due to the actuating electric currents for the line light sources 21, 21, . . . of the panel-shaped light irradiating section 22 upon the image recording medium 10 are capable of being suppressed even further. In this embodiment, the moving section 83 moves the panel-shaped light irradiating section 22 in the Y direction. Alternatively, for example, the moving section 83 may move the slit array plate 82 by a distance of 50 µm in the Y direction. As another alternative, the moving section 83 may move both the panel-shaped light irradiating section 22 and the slit array plate 82.

Figure 8:
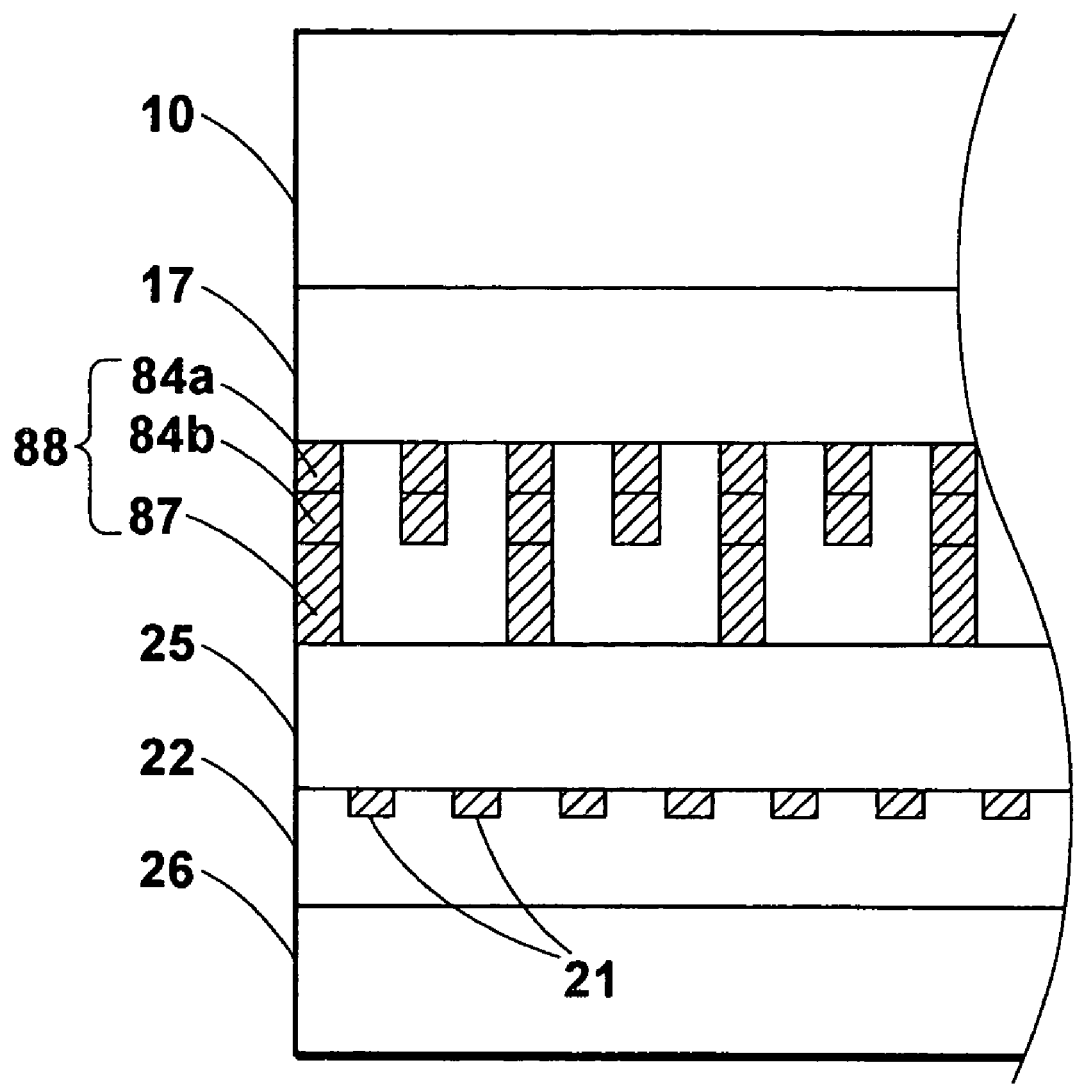
FIG. 8 is a partial sectional view showing a scanning exposure section and a slit array plate employed in a modification of the second embodiment of the read-out scanning exposure apparatus in accordance with the present invention.
Figure 9:
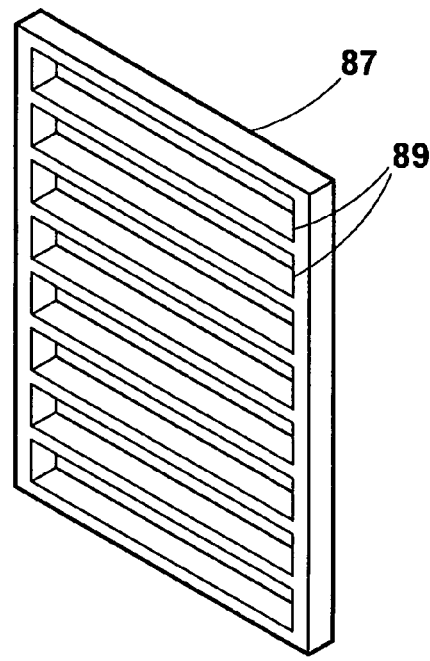
FIG. 9 is a schematic view showing a slit array thin plate constituting the slit array plate employed in the modification of the second embodiment of the read-out scanning exposure apparatus in accordance with the present invention.

As a modification of the second embodiment of the read-out scanning exposure apparatus in accordance with the present invention, a slit array plate 88 illustrated in FIG. 8 may be employed. The slit array plate 88 comprises the slit array thin plates 84a, 84b, and 87. As illustrated in FIG. 9, the slit array thin plate 87 has a thickness of 500 µm and is provided with slits 89, 89, . . . , each of which has a width of 150 µm. The slits 89, 89, . . . are located at pitches of 200 µm. The slit array plate 88 having the constitution described above is low in cost and light in weight. Therefore, the scanning exposure section is capable of being kept low in cost and light in weight.

Figure 10:
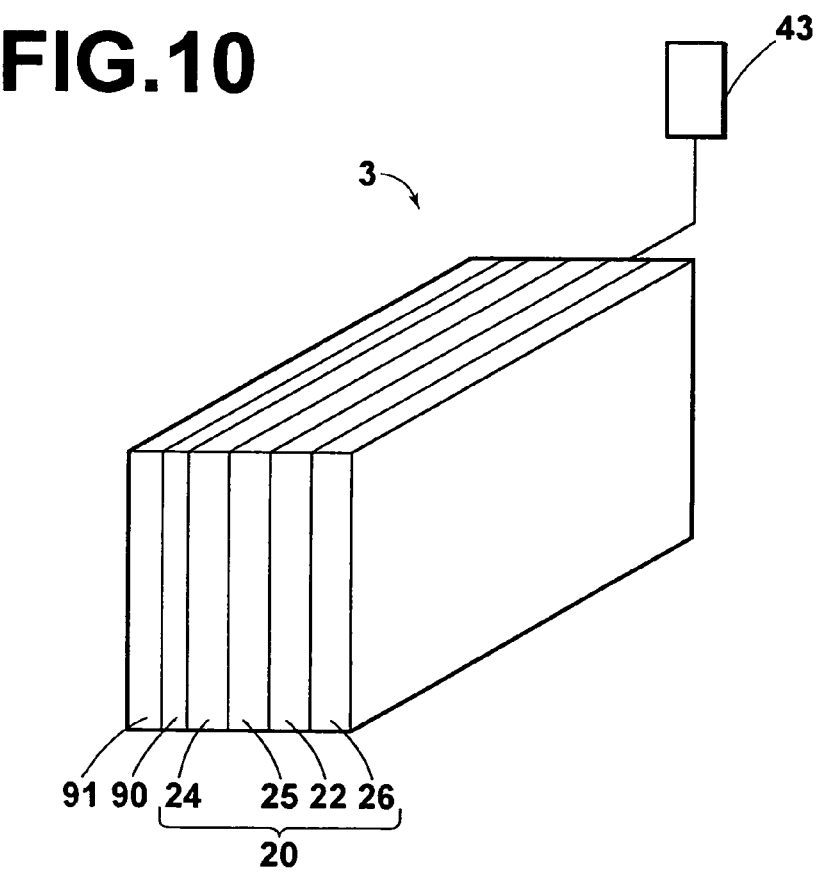
FIG. 10 is a schematic view showing an image information read-out system, in which a third embodiment of the read-out scanning exposure apparatus in accordance with the present invention is employed.
Figure 11:
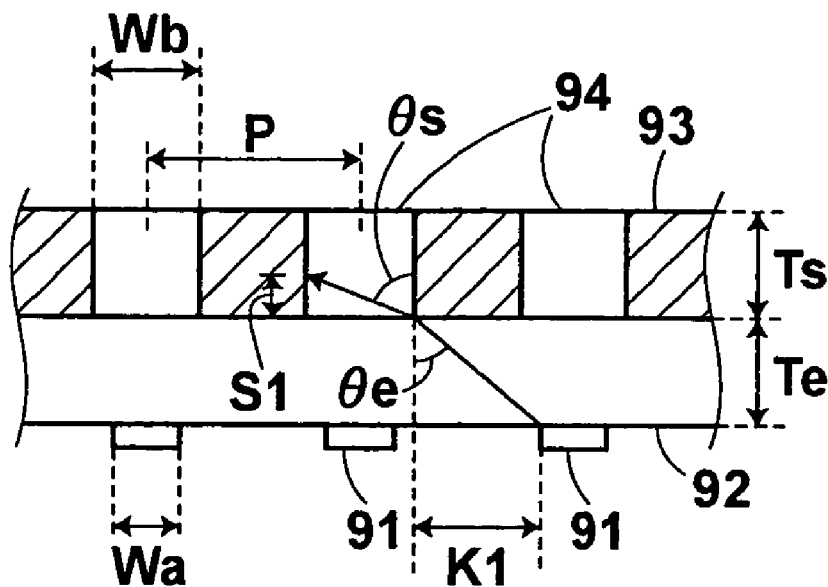
FIG. 11 is an explanatory sectional view showing a slit array plate and a transparent protective plate.
Figure 12:
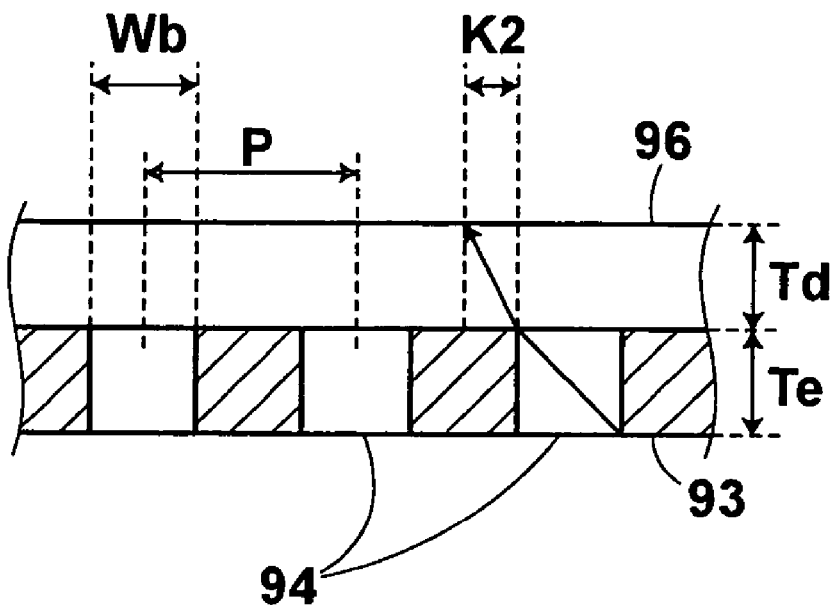
FIG. 12 is an explanatory sectional view showing a slit array plate and a transparent support plate.

An image information read-out system, in which a third embodiment of the read-out scanning exposure apparatus in accordance with the present invention is employed, will be described hereinbelow with reference to FIG. 10. FIG. 10 shows an image information read-out system 3 for reading out an image from a stimulable phosphor sheet, in which the scanning exposure section 20 for readout is employed.

With reference to FIG. 10, the image information read-out system 3 comprises the scanning exposure section 20 for irradiating the reading light beams L1, L1, . . . to a stimulable phosphor sheet 90, on which a radiation image has been stored. The image information read-out system 3 also comprises a scanning exposure control section 43. The image information read-out system 3 further comprises a photodetector 91 for detecting light M, which is emitted by the stimulable phosphor sheet 90 when the stimulable phosphor sheet 90 is exposed to the reading light beams L1, L1, . . . . The image information read-out system 3 still further comprises a signal processing section (not shown), which is connected to the photodetector 91. The photodetector 91 is located on the side of the stimulable phosphor sheet 90, which side is opposite to the side facing the scanning exposure section 20. The photodetector 91 comprises a plurality of photoelectric conversion devices, each of which detects the light M, which is emitted from a corresponding site (i.e., a corresponding pixel) on the stimulable phosphor sheet 90. The photoelectric conversion devices may be constituted of amorphous silicon sensors, CCD sensors, MOS sensors, and the like.

How the image information read-out system 3 operates will be described hereinbelow. In accordance with the control made by the scanning exposure control section 43, the line-like reading light beams L1, L1, . . . , which have been radiated out from the scanning exposure section 20 one after another, scan the stimulable phosphor sheet 90, on which the radiation image has been stored. When the stimulable phosphor sheet 90 is exposed to a reading light beam L1, the exposed site of the stimulable phosphor sheet 90 is caused by the reading light beam L1 to emit the light M in proportion to the amount of energy stored on the stimulable phosphor sheet 90 during exposure of the stimulable phosphor sheet 90 to radiation. Part of the emitted light M impinges upon the photodetector 91. The emitted light M having impinged upon the photodetector 91 is amplified and photoelectrically converted by each of the photoelectric conversion devices. An image signal component S, which represents the pixel corresponding to each of the photoelectric conversion devices, is fed out into the external signal processing section.

In this embodiment, the line light sources 21, 21, . . . of the scanning exposure section 20 are constituted of light sources, which produces light having wavelengths appropriate for causing the stimulable phosphor sheet 90 to emit the light M. With this embodiment, the same effects as those obtained with the first embodiment are capable of being obtained. Also, in lieu of the scanning exposure section 20, the scanning exposure section 80 described above may be employed.

By way of example, in cases where a slit array plate made from an electrical insulator is employed, the glass base plate 17 and the glass base plate 25 may be omitted, and only the slit array plate may be located between the panel-shaped light irradiating section 22 and the image recording medium 10. In such cases, the thickness of the read-out scanning exposure apparatus in accordance with the present invention, which thickness is taken with respect to the direction of line light irradiation, is capable of being reduced even further.

What is claimed is:

1. A read-out scanning exposure method, comprising scanning an image recording medium carrying image information recorded thereon with line light beams having been radiated out from line light sources, wherein the scanning is performed in a scanning direction intersecting with a longitudinal direction of each of the line light sources, in order for the recorded image information to be read out from the image recording medium, the read-out method further comprises:

locating light irradiating means in association with the image recording medium, wherein the light irradiating means is provided with a plurality of the line light sources, each of which radiates out a line light beam toward the image recording medium, and wherein the plurality of the line light sources are located at approximately identical pitches with respect to the scanning direction and in parallel with the longitudinal direction of each of the line light sources;

locating a slit array plate between the image recording medium and the light irradiating means, wherein the slit array plate comprises a plurality of slits, each of which is located at a position corresponding to the position of one of the line light sources; and controlling the light irradiating means such that the line light beams are radiated out one after another, with different timing, from the line light sources.

2. A method as defined in claim 1 wherein a transparent protective plate, which is transparent with respect to the line light beams and protects the line light sources, is located between the slit array plate and the light irradiating means.

3. A method as defined in claim 2 wherein a transparent support plate, which is transparent with respect to the line light beams and supports the image recording medium, is located between the image recording medium and the slit array plate.

4. A method, as defined in claim 3 where the image information is to be recorded on the image recording medium, comprising moving at least either one of the slit array plate and the light irradiating means is moved in the scanning direction, wherein each of regions of the slit array plate, which regions are other than the slits, is located at a position that intervenes between the image recording medium and one of the line light sources.

5. A method as defined in claim 4 wherein the line light sources are electroluminescent light sources.

6. A method as defined in claim 3 wherein the line light sources are electroluminescent light sources.

7. A method, as defined in claim 2 where the image information is to be recorded on the image recording medium, comprising moving at least either one of the slit array plate and the light irradiating means in the scanning direction, wherein each of regions of the slit array plate, which regions are other than the slits, is located at a position that intervenes between the image recording medium and one of the line light sources.

8. A method as defined in claim 7 wherein the line light sources are electroluminescent light sources.

9. A method as defined in claim 2 wherein the line light sources are electroluminescent light sources.

10. A method as defined in claim 1 wherein a transparent support plate, which is transparent with respect to the line light beams and supports the image recording medium, is located between the image recording medium and the slit array plate.

11. A method, as defined in claim 10 where the image information is to be recorded on the image recording medium, comprising moving at least either one of the slit array plate and the light irradiating means in the scanning direction, wherein each of regions of the slit array plate, which regions are other than the slits, is located at a position that intervenes between the image recording medium and one of the line light sources.

12. A method as defined in claim 11 wherein the line light sources are electroluminescent light sources.

13. A method as defined in claim 10 wherein the line light sources are electroluminescent light sources.

14. A methods as defined in claim 1 where the image information is to be recorded on the image recording medium, comprising moving at least either one of the slit array plate and the light irradiating means in the scanning direction, wherein each of regions of the slit array plate, which regions are other than the slits, is located at a position that intervenes between the image recording medium and one of the line light sources.

15. A method as defined in claim 14 wherein the line light sources are electroluminescent light sources.

16. A method as defined in claim 1 wherein the line light sources are electroluminescent light sources.

17. A method as defined in claim 1, wherein, when one of the plurality of light sources irradiates a timed light beam through a corresponding slit of the plurality of slits, a thickness of the slit array plate reflects said timed light beam entering any slit adjacent to said corresponding slit.

18. A read-out scanning exposure apparatus, comprising an image recording medium carrying image information recorded thereon which is scanned with line light beams having been radiated out from line light sources, wherein the scanning is performed in a scanning direction intersecting with a longitudinal direction of each of the line light sources, in order for the recorded image information to be read out from the image recording medium, the read-out scanning apparatus further comprising:

light irradiating means provided with a plurality of the line light sources, each of which radiates out a line light beam toward the image recording medium, wherein the plurality of the line light sources are located at approximately identical pitches with respect to the scanning direction and in parallel with the longitudinal direction of each of the line light sources;

a slit array plate, which is located between the image recording medium and the light irradiating means, wherein the slit array plate comprises a plurality of slits, each of which is located at a position corresponding to the position of one of the line light sources; and scanning exposure control means for controlling the light irradiating means such that the line light beams are radiated out one after another with different timing from the line light sources.

19. An apparatus as defined in claim 18 further comprising a transparent protective plate, which is transparent with respect to the line light beams and protects the line light sources, wherein the transparent protective plate is located between the slit array plate and the light irradiating means.

20. An apparatus as defined in claim 19 further comprising a transparent support plate, which is transparent with respect to the line light beams and supports the image recording medium, wherein the transparent support plate is located between the image recording medium and the slit array plate, and wherein the line light beams, which have passed through adjacent slits, do not overlap each other on the image recording medium.

21. An apparatus as defined in claim 20 further comprising moving means for moving at least either one of the slit array plate and the light irradiating means in the scanning direction when the image information is to be recorded on the image recording medium, wherein each of regions of the slit array plate, which regions are other than the slits, is located at a position that intervenes between the image recording medium and one of the line light sources.

22. An apparatus as defined in claim 21 wherein the line light sources are electroluminescent light sources.

23. An apparatus as defined in claim 20 wherein the line light sources are electroluminescent light sources.

24. An apparatus as defined in claim 19 further comprises moving means for moving at least either one of the slit array plate and the light irradiating means in the scanning direction when the image information is to be recorded on the image recording medium, wherein each of regions of the slit array plate, which regions are other than the slits, is located at a position that intervenes between the image recording medium and one of the line light sources.

25. An apparatus as defined in claim 24 wherein the line light sources are electroluminescent light sources.

26. An apparatus as defined in claim 19 wherein the line light sources are electroluminescent light sources.

27. An apparatus as defined in claim 18 further comprising a transparent support plate, which is transparent with respect to the line light beams and supports the image recording medium, wherein the transparent support plate is located between the image recording medium and the slit array plate, and wherein the line light beams, which have passed through adjacent slits, do not overlap each other on the image recording medium.

28. An apparatus as defined in claim 27 further comprising moving means for moving at least either one of the slit array plate and the light irradiating means in the scanning direction when the image information is to be recorded on the image recording medium, wherein each of regions of the slit array plate, which regions are other than the slits, is located at a position that intervenes between the image recording medium and one of the line light sources.

29. An apparatus as defined in claim 28 wherein the line light sources are electroluminescent light sources.

30. An apparatus as defined in claim 27 wherein the line light sources are electroluminescent light sources.

31. An apparatus as defined in claim 18 further comprising moving means for moving at least either one of the slit array plate and the light irradiating means in the scanning direction when the image information is to be recorded on the image recording medium, wherein each of regions of the slit array plate, which regions are other than the slits, is located at a position that intervenes between the image recording medium and one of the line light sources.

32. An apparatus as defined in claim 31 wherein the line light sources are electroluminescent light sources.

33. An apparatus as defined in claim 18 wherein the line light sources are electroluminescent light sources.

34. An apparatus as defined in claim 18, wherein, when one of the plurality of light sources irradiates a timed light beam through a corresponding slit of the plurality of slits, a thickness of the slit array plate reflects said timed light beam entering any slit adjacent to said corresponding slit.

35. An apparatus as defined in claim 18, wherein the slit array plate further comprises a plurality of thin slit array plates.

36. An apparatus as defined in claim 35, wherein at least one of the plurality of thin slit array plates comprises a plurality of bridges extending in a direction normal to a longitudinal direction of the slit.

37. An apparatus as defined in claim 18, wherein the slit array plate has 4,000 slits corresponding to each of the plurality of line light sources.

* * * * *